(12) United States Patent
Bondu

(10) Patent No.: US 9,630,456 B2
(45) Date of Patent: *Apr. 25, 2017

(54) BEAD OF A TIRE FOR A HEAVY VEHICLE OF CONSTRUCTION PLANT TYPE

(75) Inventor: Lucien Bondu, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 431 days.

This patent is subject to a terminal disclaimer.

(21) Appl. No.: 14/125,074

(22) PCT Filed: Jun. 6, 2012

(86) PCT No.: PCT/EP2012/060650
§ 371 (c)(1),
(2), (4) Date: Feb. 18, 2014

(87) PCT Pub. No.: WO2012/168273
PCT Pub. Date: Dec. 13, 2012

(65) Prior Publication Data
US 2014/0150949 A1 Jun. 5, 2014

(30) Foreign Application Priority Data
Jun. 7, 2011 (FR) ...................... 11 54932

(51) Int. Cl.
*B60C 15/00* (2006.01)
*B60C 15/06* (2006.01)

(52) U.S. Cl.
CPC ...... *B60C 15/0603* (2013.04); *B60C 15/0036* (2013.04); *B60C 15/06* (2013.01);
(Continued)

(58) Field of Classification Search
CPC . B60C 15/00; B60C 15/0009; B60C 15/0063; B60C 15/06
See application file for complete search history.

(56) References Cited

U.S. PATENT DOCUMENTS 3,406,733 A * 10/1968 Boileau ............... B60C 9/16
                                                         152/542
4,044,811 A * 8/1977 Dudek ............... B29D 30/0679
                                                         152/452
(Continued)

FOREIGN PATENT DOCUMENTS

JP         3224805        10/1991
JP       H08332813 A      12/1996
(Continued)

OTHER PUBLICATIONS

PCT/EP2012/060650—International Search Report (English translation included), dated Aug. 10, 2012, 2 pages.
(Continued)

*Primary Examiner* — Justin Fischer
(74) *Attorney, Agent, or Firm* — Dickinson Wright PLLC

(57) ABSTRACT

The invention relates to improving the endurance of the beads of a radial tire for a heavy vehicle of construction plant type, by reducing the cracking that starts at the surface of contact between a first polymer filling material that is radially furthest towards the inside and in contact with the bead wire and a second polymer filling material that is radially on the outside of the first polymer filling material. According to the invention, a transition element, made of a polymer transition material, is in contact, via its radially inner face, with the first polymer filling material and is in contact, via its radially outer face, with the second polymer filling material, and the elastic modulus at 10% elongation of the polymer transition material is somewhere between the
(Continued)

respective elastic moduluses at 10% elongation of the first and second polymer filling materials.

10 Claims, 2 Drawing Sheets

(52) U.S. Cl.
CPC .... *B60C 15/0607* (2013.04); *B60C 2015/061* (2013.04); *B60C 2200/065* (2013.04)

(56) References Cited

U.S. PATENT DOCUMENTS

| | | |
|---|---|---|
| 4,716,950 A | 1/1988 | Morikawa et al. |
| 5,236,031 A * | 8/1993 | Honbo ............... B60C 15/0027 152/541 |
| 5,433,257 A | 7/1995 | Yamaguchi et al. |
| 5,725,702 A | 3/1998 | Nakamura et al. |
| 8,327,898 B2 | 12/2012 | Oogane |
| 2003/0089440 A1 | 5/2003 | Ueyoko et al. |

FOREIGN PATENT DOCUMENTS

| | | |
|---|---|---|
| JP | 2008-307949 | * 12/2008 |
| JP | 2009-113715 A | 5/2009 |

OTHER PUBLICATIONS

Japanese Office Action (and English Language Translation) issued in corresponding Japanese Patent Application No. 2014-547924, dated Sep. 30, 2016.

* cited by examiner

BEAD OF A TIRE FOR A HEAVY VEHICLE OF CONSTRUCTION PLANT TYPE

This application claims benefit of the filing date of PCT/EP2012/060650, filed Jun. 6, 2012, which claims the benefit of FR1154932, filed Jun. 7, 2011, the entire contents of each of which are incorporated herein by reference for all purposes.

BACKGROUND

1. Field

The present invention relates to a radial tire intended to be fitted to a heavy vehicle of construction plant type.

2. Description of Related Art

Although not restricted to this type of application, the invention will be more particularly described with reference to a radial tire intended to be mounted on a dumper, a vehicle for transporting materials extracted from quarries or open cast mines. The nominal diameter of the rim of such a tire, within the meaning of the European Tire and Rim Technical Organisation (ETRTO) standard, is a minimum of 25"

The following definitions apply in what follows:

"Meridian plane": a plane containing the axis of rotation of the tire.

"Equatorial plane": the plane passing through the middle of the tire tread surface and perpendicular to the axis of rotation of the tire.

"Radial direction": a direction perpendicular to the axis of rotation of the tire.

"Axial direction": a direction parallel to the axis of rotation of the tire.

"Circumferential direction": a direction perpendicular to a meridian plane.

"Radial distance": a distance measured perpendicular to the axis of rotation of the tire and from the axis of rotation of the tire.

"Axial distance": a distance measured parallel to the axis of rotation of the tire and from the equatorial plane.

"Radially": in a radial direction.

"Axially": in an axial direction.

"Radially on the inside, or respectively radially on the outside": which is situated at a smaller or greater radial distance, respectively.

"Axially on the inside, or respectively axially on the outside": which is situated at a smaller or greater axial distance, respectively.

A tire comprises two beads which provide the mechanical connection between the tire and the rim on which it is mounted, the beads being joined respectively by two sidewalls to a tread intended to come into contact with the ground via a tread surface.

A radial tire more particularly comprises a reinforcement, comprising a crown reinforcement, radially on the inside of the tread, and a carcass reinforcement radially on the inside of the crown reinforcement.

The carcass reinforcement of a radial tire for a heavy vehicle of construction plant type usually comprises at least one carcass reinforcement layer made up of metallic reinforcing elements coated in a polymer coating material. The metallic reinforcing elements are substantially parallel to one another and make an angle of between 85° et 95° with the circumferential direction. The carcass reinforcement layer comprises a main part, joining the two beads together and wrapped, within each bead, around a bead wire. The bead wire comprises a circumferential reinforcing element, usually made of metal, surrounded by at least one material, which, and this list is not exhaustive, may be made of polymer or textile. The carcass reinforcement layer is wrapped around the bead wire from the inside towards the outside of the tire to form a turn-up having an end. The turn-up, within each bead, allows the carcass reinforcement layer to be anchored to the bead wire of the bead.

Each bead comprises a filling element which extends the bead wire radially outwards. The filling element is made of at least one polymer filling material. The filling element is generally made of a radial stack of at least two polymer filling materials which are in contact along a contact surface that intersects any meridian plane along a meridian line. The filling element axially separates the main part from the turn-up.

A polymer material, after curing, is mechanically characterized by tensile stress—deformation characteristics which are determined by tensile testing. This tensile testing is carried out by a person skilled in the art, on a test specimen, according to a known method, for example in accordance with international standard ISO 37, and under standard temperature (23+or −2° C.) and moisture (50+or −5% relative humidity) conditions defined by International Standard ISO 471. For a polymer compound, the elastic modulus at 10% elongation, expressed in mega pascals (MPa), is the tensile stress measured for a 10% elongation of the test specimen.

A polymer material, after curing, is also mechanically characterized by its hardness. The hardness is notably defined by the Shore A hardness determined in accordance with standard ASTM D 2240-86.

When the vehicle is being driven along, the tire, mounted on its rim, inflated and compressed under the load of the vehicle, is subjected to bending cycles, particularly in its beads and its sidewalls.

Considering that a bead behaves mechanically in bending like a beam the respectively outer and inner axes of which are the main part and the turn-up part, the turn-up, subjected to the bending cycles, undergoes compressive deformations likely to lead to its fatigue failure and therefore to a reduction in the endurance of the bead and in the life of the tire.

Document EP 2 216 189 describes a tire bead the endurance of which is improved by reducing the compressive deformations in the turn-up when the bead bends on the rim when in use. This objective is achieved by a turn-up which is such that the distance between the turn-up and the main part decreases continuously, radially towards the outside, from the bead wire, as far as a minimum distance and then increases continuously as far as a maximum distance. The turn-up extends radially on the outside of the point of the turn-up that corresponds to the maximum distance between the turn-up and the main part.

The bending cycles also lead to stresses and deformations, mainly in shear and in compression, in the polymer filling material, because of the bending of the bead on the rim flange.

In particular, at the surface of contact between two polymer filling materials, the bending cycles give rise to cracks which spread through the radially outermost polymer filling material and are likely, over time, to lead to damage to the tire that entails the tire being replaced.

According to the inventors, the cracks start as a result of the stiffness gradient between the radially innermost polymer filling material in contact with the bead wire and the polymer filling material which is radially on the outside of it and adjacent to it along the contact surface Imperfect cohesion between the two polymer filling materials, along their contact surface, is a factor initiating cracking.

The rate at which the cracks spread is dependent firstly on the amplitude and frequency of the stress deformation cycles and secondly on the respective siffnesses of the polymer filling materials. By way of example, the elastic modulus at 10% elongation of the radially innermost polymer filling material in contact with the bead wire may be equal to 3 times the elastic modulus at 10% elongation of the polymer filling material radially on the outside of and adjacent to it.

The inventors have set themselves the objective of increasing the endurance of the beads of a radial tire for a heavy vehicle of construction plant type by reducing the cracking that starts at the surface of contact between a radially innermost first polymer filling material in contact with the bead wire and a second polymer filling material radially on the outside of the first polymer filling material.

SUMMARY

According to the invention, this objective has been achieved by:
a tire for a heavy vehicle of construction plant type comprising two beads intended to come into contact with a rim, a carcass reinforcement comprising at least one carcass reinforcement layer made of metal reinforcing elements,
the carcass reinforcing layer comprising a main part wrapped, within each bead, from the inside towards the outside of the tire, around a bead wire to form a turn-up,
the distance between the turn-up and the main part decreasing, radially towards the outside, from the bead wire, as far as a minimum distance, then increasing continuously as far as a maximum distance,
each bead comprising a filling element extending the bead wire radially towards the outside,
the filling element being formed of at least two polymer filling materials
a first polymer filling material being radially furthest towards the inside and in contact with the bead wire,
a second polymer filling material being radially on the outside of the first polymer filling material and having an elastic modulus at 10% elongation that is lower than the elastic modulus at 10% elongation of the first polymer filling material
a transition element, made of a polymer transition material, being in contact, via its radially inner face, with the first polymer filling material and in contact, via its radially outer face, with the second polymer filling material,
and the elastic modulus at 10% elongation of the polymer transition material being somewhere between the respective elastic moduluses at 10% elongation of the first and second polymer filling materials.

According to the invention, it is advantageous to have a transition element, made of a polymer transition material, in contact, via its radially inner face, with the first polymer filling material and in contact, via its radially outer face, with the second polymer filling material.

A transition element is an element that is interposed between a first polymer filling material and a second polymer filling material.

The transition element is usually made up of a single polymer transition material. However, it may be made up of a radial stack of polymer transition materials, of which the respective elastic moduluses at 10% elongation are somewhere between the respective elastic moduluses at 10% elongation of the first and second polymer filling materials and decrease as the radial distance of the polymer filling materials increases.

The thickness of the transition element refers to the thickness of the transition element as measured away from the zones of contact with, respectively, the carcass reinforcement main part and the carcass reinforcement turn-up, in which part and portion the transition element is tapered to the radially outer and radially inner ends of the transition element respectively. The thickness of the transition element is often substantially constant, but could equally be variable. In the case of a transition element made up of a radial stack of polymer transition materials, the thickness of the transition element is the overall thickness of the stack in the radial direction of polymer transition materials.

The transition element is said to be in contact, via its radially inner face, with a first polymer filling material when the radially inner face of the transition element geometrically coincides with the radially outer face of the first polymer filling material, except in the axially inner part of the radially inner face of the transition element in contact with the main part.

The transition element is said to be in contact, via its radially outer face, with a second polymer filling material when the radially outer face of the transition element geometrically coincides with the radially inner face of the second polymer filling material, except in the axially outer part of the radially outer face of the transition element in contact with the turn-up.

The elastic modulus at 10% elongation of the polymer transition material is advantageously somewhere between the respective elastic moduluses at 10% elongation of the first and second polymer filling materials, the second polymer filling material having an elastic modulus at 10% elongation that is lower than the elastic modulus at 10% elongation of the first polymer filling material. The progressive decrease in the elastic moduluses at 10% elongation when making the transition from the first polymer filling material to the polymer transition material, then to the second polymer filling material, allows a decreasing and progressive stiffness gradient, making it possible locally to reduce the stresses and deformations in the zone marking the transition between the first and second filling materials and, therefore, making it possible to slow the spread of cracks.

The greater the respective elastic moduluses at 10% elongation of the first and second polymer filling materials, the more significant the advantage afforded by the elastic modulus at 10% elongation of the intermediate polymer transition material. By way of example, in a tire according to the invention, the elastic modulus at 10% elongation of the first polymer filler material is equal to approximately 2.9 times the elastic modulus at 10% elongation of the second polymer filling material.

The thickness (e) of the transition element is advantageously at least equal to 0.1 times the distance between the end of the turn-up and the main part.

The distance between the end of the turn-up and the main part is the distance measured, along the straight line passing through the end of the turn-up and perpendicular to the main part, between the axially inner generatrix of the reinforcing elements of the turn-up and the axially outer generatrix of the reinforcing elements of the main part.

This minimum thickness of the transition element makes it possible to establish a minimum stiffness gradient that allows the rate of spread of cracks to be decreased.

The thickness of the transition element is also advantageously at most equal to 0.5 times the distance between the end of the turn-up and the main part.

Specifically, the heat dissipation of the polymer transition material is greater than that of the second polymer filling material, because of its higher elastic modulus at 10% elongation. As a result, above and beyond a maximum thickness of transition element, when the transition element is substituted for some of the second polymer filling material with respect to the reference tire, the excessive volume of polymer transition material leads to an increase in bead temperature that is detrimental to its life, hence the need to place a maximum limit value on the thickness of the transition element.

Moreover, the inventors have chosen to limit the thickness of the transition element in order locally to influence cracking while at the same time limiting the impact that the transition element has on the flexural stiffness of the bead. The purpose of the transition element is not to allow a variation in the flexural stiffness of the bead but to influence the rate at which cracks spread between the first and second polymer filling materials. In other words, the overall bending of the bead on the rim flange is of the same order, with or without transition element.

Is further advantageous for the elastic modulus at 10% elongation of the polymer transition material to be at least equal to 0.9 times and at most equal 1.1 times the arithmetic mean of the respective elastic moduluses at 10% elongation of the first and second polymer filling materials. This range of values for the elastic modulus at 10% elongation of the polymer transition material guarantees a minimum stiffness gradient when making the transitions successively from the first polymer filling material to the polymer transition material and then to the second polymer filling material, thus significantly reducing the rate at which cracks spread.

The radially inner face of the transition element is advantageously in continuous contact with the main part between a first point of contact and a last point of contact which is the radially outermost point of the transition element. This continuous surface for contact between the main part and the transition element makes it possible to reduce the rate at which cracks spread, these cracks being started, in this contact zone, on the axially outer face of the main part and spreading axially outwards through the second polymer filling material.

It is also advantageous for the distance (a) between the first point of contact and the last point of contact of the radially inner face of the transition element with the main part to be at least equal to the distance and at most equal to three times the distance between the end of the turn-up and the main part.

This distance is the distance between the two straight lines perpendicular to the main part and passing respectively through the first and last points of contact of the radially inner face of the transition element with the main part.

This distance guarantees a zone of contact between the transition element and the main part, in a zone of maximum curvature of the main part, the axially outer face of which is a zone in which cracks are most likely to start. The range of values on this distance, which is defined as a function of the distance between the end of the turn-up and the main part, guarantees that the transition element will be present throughout the zones where cracks are likely to start on the axially outer face of the main part.

Advantageously, the maximum distance between the turn-up and the main part is at least equal to 1.1 times the minimum distance between the turn-up and the main part. The result of this is that the filling element comprised axially between the turn-up and the main part, has a narrowing resulting in closeness between the turn-up and the main part allowing the turn-up not to be placed under compression when the tire is being driven on.

It is finally advantageous for the distance from the point of the turn-up, positioned at the minimum distance axially on the outside of the main part, to the reference line of the rim, to be at least equal to 1.25 times and at most equal to 2.5 times the distance from the radially outermost point of the rim to the reference line of the rim, and for the distance from the point of the turn-up, positioned at the maximum distance axially on the outside of the main part, to the reference line of the rim to be at least equal to 2 times and at most equal to 4 times the distance from the radially outermost point of the rim to the reference line of the rim. The reference line of the rim usually, to a person skilled in the art, corresponds to the seat diameter. The distance from the radially outermost point of the rim to the reference line of the rim defines the height of the rim flange. Radially positioning the points of the turn-up that are respectively closest and furthest away from the main part within these ranges of values optimizes tensions and guarantees that there will be no compression in the turn-up.

BRIEF DESCRIPTION OF THE FIGURES

The features of the invention will be better understood from the description of the attached FIGS. 1 and 2.

DETAILED DESCRIPTION OF SPECIFIC EMBODIMENTS

Figure 1:
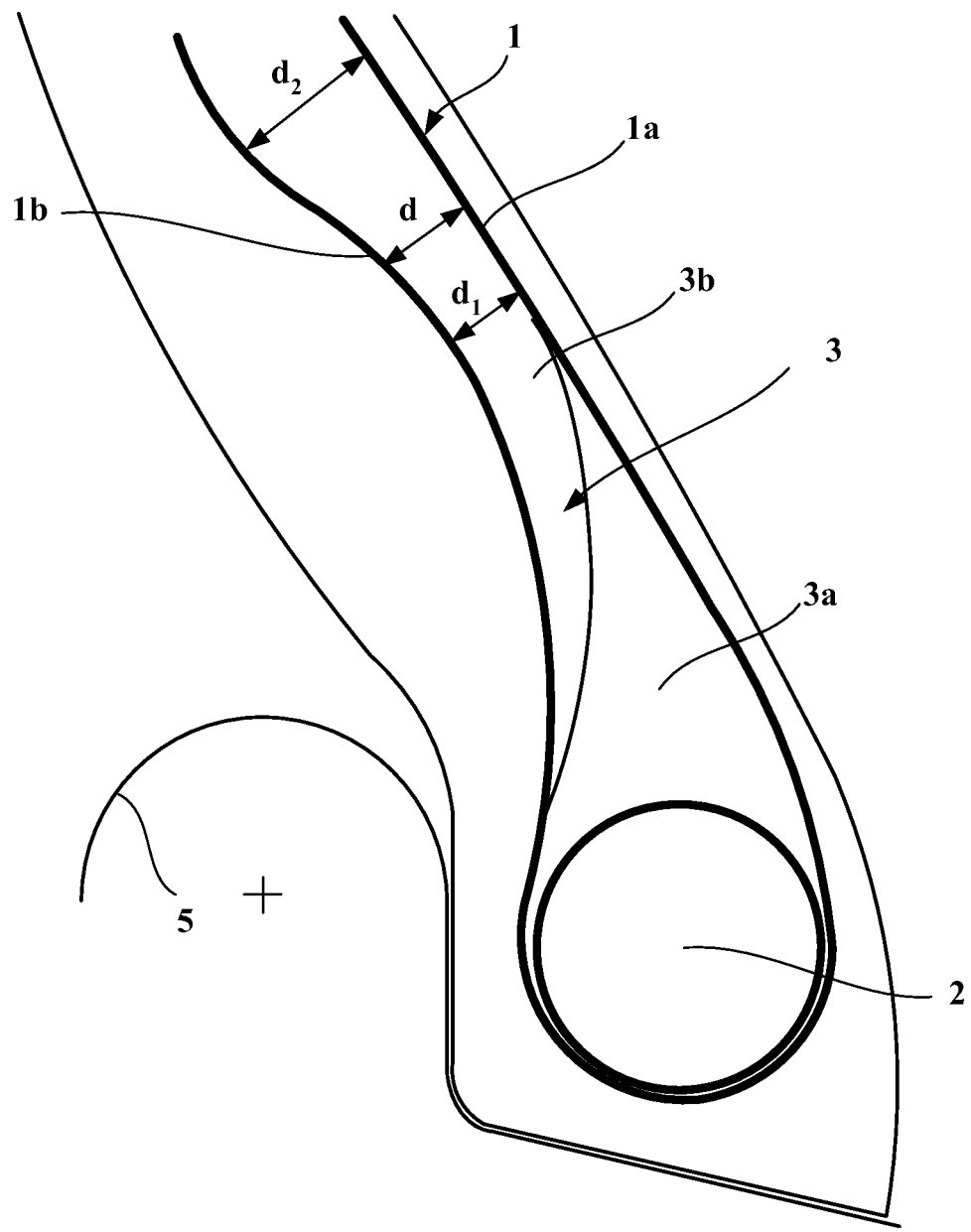
FIG. 1 is a view in section on a meridian plane of the bead of a tire for a heavy vehicle of construction plant type, of the prior art.
Figure 2:
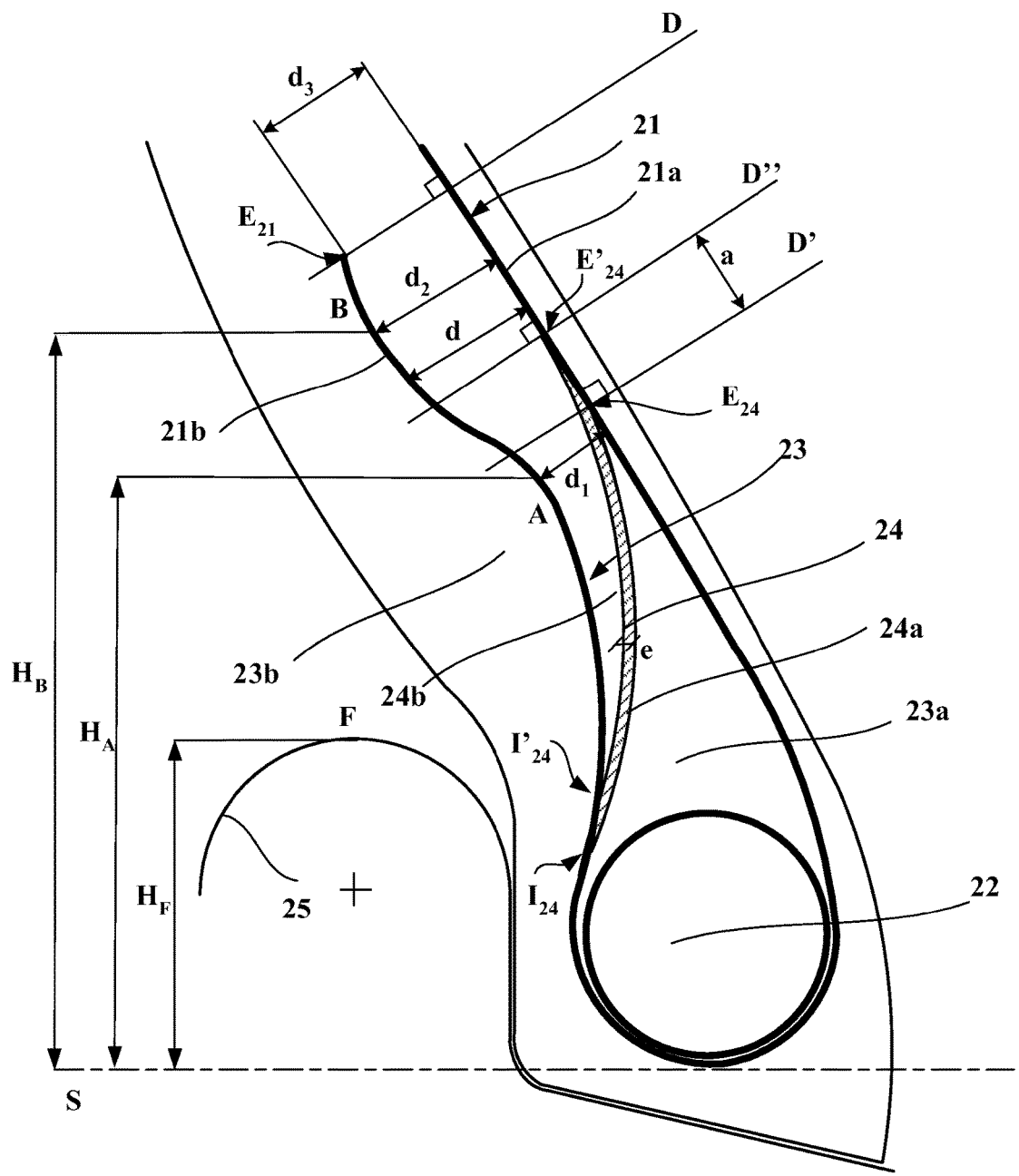
FIG. 2 is a view in section on a meridian plane of the bead of a tire for a heavy vehicle of construction plant type, according to the invention.

In order to make them easier to understand, FIGS. 1 and 2 are not drawn to scale.

FIG. 1 depicts a bead of a tire for a heavy vehicle of construction plant type according to the prior art, comprising:

a carcass reinforcement comprising at least one carcass reinforcement layer 1 made of metal reinforcing elements, the carcass reinforcement layer comprising a main part 1*a* wrapped, within each bead, from the inside towards the outside of the tire, around a bead wire 2, to form a turn-up 1*b*, the distance d between the turn-up 1*b* and the main part 1*a* decreasing continuously, radially towards the outside, from the bead wire 2, as far as a minimum distance $d_1$, then increasing continuously as far as a maximum distance $d_2$, each bead comprising a filling element 3 extending the bead wire 2 radially outwards, the filling element being made of two polymer filling materials (3*a*, 3*b*), a first polymer filling material 3*a* being radially innermost and in contact with the bead wire core 2, a second polymer filling material 3*b* being radially on the outside of the first polymer filling materials 3*a* and having an elastic modulus at 10% elongation that is lower than the elastic modulus at 10% elongation of the first polymer filling material 3*a*.

FIG. 2 shows a bead of a tire for a heavy vehicle of construction plant type, according to the invention, comprising:

a carcass reinforcement comprising a carcass reinforcement layer 21 made up of metal reinforcing elements, the carcass reinforcement layer comprising a main part 21a wrapped, in each bead, from the inside towards the outside of the tire, around a bead wire 22, to form a turn-up 21b, the distance d between the turn-up 21b and the main part 21a decreasing continuously, radially towards the outside, from the bead wire 22, as far as a minimum $d_1$, then increasing continuously as far as a maximum distance $d_2$, the bead comprising a filling element 23 extending the bead wire 22 radially outwards, the filling element being formed of two polymer filling materials (23a, 23b), a first polymer filling material 23a being radially furthest towards the inside and in contact with the bead wire 22, a second polymer filling material 23b being radially on the outside of the first polymer filling material 23a and having an elastic modulus at 10% elongation that is lower than the elastic modulus at 10% elongation of the first polymer filling material 23a, a transition element 24, made of a polymer transition material, of thickness e, being in contact, via its radially inner face 24a, with the first polymer filling material 23a and in contact, via its radially outer face 24b, with the second polymer filling material 23b, and the elastic modulus at 10% elongation of the polymer transition material 24 being somewhere between the respective elastic moduluses at 10% elongation of the first and second polymer filling materials.

The geometry of the turn-up 21b is characterized by the point A of the turn-up 21b, which point is positioned at the minimum distance $d_1$, axially on the outside of the main part 21a, and at a distance $H_A$, radially on the outside of a reference line S of the rim 25, and by the point B of the turn-up 21b, which point is positioned at the maximum distance $d_2$, axially on the outside of the main part 21a, and at a distance $H_B$, radially on the outside of a reference line S of the rim 25. The respective positions of the points A and B are defined with respect to the radially outermost point F of the rim 25 which point is positioned at a distance $H_F$, radially on the outside of a reference line S of the rim 25.

The transition element 24 has a thickness e that is generally constant, but does not have to be so, away from the zones of contact with, respectively, the main part and the turn-up, in which zones the transition element tapers as far as the radially outer $E'_{24}$ and radially inner $I_{24}$ ends of the transition element respectively, where the radially inner 24a and radially outer 24b faces of the transition element 24 meet.

The radially inner face 24a of the transition element 24 is delimited respectively by its radially innermost point $I_{24}$ in contact with the turn-up 23b and by its radially outermost point $E'_{24}$ in contact with the main part 21a.

The radially outer face 24b of the transition element 24 is delimited respectively by its radially innermost point $I_{24}$ in contact with the turn-up 23b and by its radially outermost point $E'_{24}$ in contact with the main part 21a.

The zone of continuous contact between the transition element 24 and the main part 21a is created along the radially inner face 24a of the transition element 24 and is delimited radially by the radially innermost first point of contact $E_{24}$ and the radially outermost last point of contact $E'_{24}$, which is also the radially outer end of the transition element.

The zone of continuous contact between the transition element 24 and the turn-up 21a is created along the radially outer face 24b of the transition element 24 and is delimited radially by the radially outermost first point of contact $I'_{24}$ and the radially innermost last point of contact $I_{24}$, which is also the radially inner end of the transition element 24.

The distance $d_3$ between the end $E_{21}$ of the turn-up 21b and the main part 21a is the distance measured, along the straight line D passing through the end $E_{21}$ of the turn-up and perpendicular to the main part, between the axially inner generatrix of the reinforcing elements of the turn-up and the axially outer generatrix of the reinforcing elements of the main part.

The distance a between the respective first and last points of contact of the radially inner face 24a of the transition element 24 with the main part 21a is the distance measured between the straight lines D' and D" which are perpendicular to the main part 21a at $E_{24}$ and $E'_{24}$.

The invention has been studied more particularly in the case of a tire for a heavy vehicle of the dumper type of size 59/80R63. According to the ETRTO standard, the nominal service conditions for such a tire are an inflation pressure of 6 bars, a static load of 99 tones, and covering a distance of between 16 and 32 km each hour.

The 59/80R63 tire was designed according to the invention, as depicted in FIG. 2.

As far as the geometry of the turn-up 21b is concerned, the point A of the turn-up 21b is positioned at the minimum distance $d_1$ equal to 18 mm, axially on the outside of the main part 21a, and at a distance $H_A$ equal to 200 mm, radially on the outside of a reference line S of the rim 25. The point B of the turn-up 21b is positioned at the maximum distance $d_2$ equal to 27 mm, axially on the outside of the main part 21a, and at a distance $H_B$ equal to 390 mm, radially on the outside of a reference line S of the rim 25. The respective positions of the points A and B are defined with respect to the radially outermost point F of the rim 25, which point is positioned at a distance $H_F$ equal to 127 mm radially on the outside of a reference line S of the rim 25.

The thickness e of the transition element 24 is constant and equal to 4.5 mm, namely 0.3 times the distance $d_3$ between the end $E_{21}$ of the turn-up and the main part 21a which is equal to 15 mm.

The elastic moduluses at 10% elongation of the first polymer filling material, the polymer transition material and the second polymer filling material are respectively equal to 10 MPa, 6.5 MPa and 3.5 MPa. As a result, the elastic modulus at 10% elongation of the polymer transition material is somewhere between the respective elastic moduluses at 10% elongation of the first and second polymer filling materials and is equal to 0.96 times the arithmetic mean of the respective elastic moduluses at 10% elongation of the first and second polymer filling materials.

The distance a between the first point of contact $E_{24}$ and the last point of contact $E'_{24}$ of the radially inner face 24a of the transition element 24, with the main part 21a, is equal to 22.5 mm, namely 1.5 times the distance $d_3$ between the end $E_{21}$ of the turn-up 21b and the main part 21a.

Simulations of finite-element calculations were carried out respectively on a reference tire, as depicted in FIG. 1, and on a tire according to the invention, as depicted in FIG. 2. For the reference tire, the elongation of the second polymer filling material 3b, in the region of the radially inner face thereof, is equal to 2.5 times the elongation of the first polymer filling material 3a, in the region of the radially outer face thereof. For the tire according to the invention, the elongation of the polymer transition material 24, in the region of the radially inner face 24a thereof, is equal to 1.5 times the elongation of the first polymer filling material 23a in the region of the radially outer face thereof. Likewise, for the tire according to the invention, the elongation of the second polymer filling material 23b, in the region of the radially inner face 24a thereof, is equal to 1.5 times the elongation of the polymer transition material 24, in the region of the radially outer face thereof.

As a result, the rate at which a crack spreads from the first polymer filling material 23a to the polymer transition material 24, then from the polymer transition material 24 to the second polymer filling material 23b, in the case of the invention, is slower than the rate at which a crack spreads from the first polymer filling material 3a to the second polymer filling material 3b in the case of the reference tire, because the ratio of the elongation of the polymer transition material 24 with respect to the elongation of the first polymer filling material 23a, and the ratio of the elongation of the second polymer filling material 23b with respect to the elongation of the polymer transition material 24, are lower than the ratio of the elongation of the second polymer filling material 3b with respect to the elongation of the first polymer filling material 3a.

The invention should not be interpreted as being restricted to the example illustrated in FIG. 2, but may be extended to other alternative forms of embodiment, for example and nonlimitingly, relating to the number of polymer transition materials forming a stack in the radial direction between the first and second polymer filling materials, or to the number of filling materials, greater than 2, forming the filling element.

The invention claimed is:

1. A tire for a heavy vehicle of construction plant type comprising:
   two beads adapted to come into contact with a rim,
   a carcass reinforcement comprising:
      at least one carcass reinforcement layer made of a metal reinforcing elements, the carcass reinforcing layer comprising:
         a main part wrapped, within each bead, from the inside towards the outside of the tire around a bead wire to form a turn-up,
         wherein the distance (d) between the turn-up and the main part decreases continuously, radially towards the outside, from the bead wire, as far as a minimum distance ($d_1$), then increases continuously as far as a maximum distance ($d_2$),
   wherein each bead comprises:
      a filling element extending the bead wire radially towards the outside,
      wherein the filling element is formed of at least two polymer filling materials,
         wherein a first polymer filling material is radially furthest towards the inside and in contact with the bead wire, and
         wherein a second polymer filling material is radially on the outside of the first polymer filling material, and having an elastic modulus at 10% elongation that is lower than the elastic modulus at 10% elongation of the first polymer filling material,
         wherein a transition element, made of a polymer transition material, is in contact, via its radially inner face, with the first polymer filling material and in contact, via its radially outer face, with the second polymer filling material, and
         wherein the elastic modulus at 10% elongation of the polymer transition material is between the respective elastic moduli at 10% elongation of the first and second polymer filling materials;
   wherein the radially inner face of the transition element is in continuous contact with the main part between a first point of contact and a last point of contact which is a radially outermost point of the transition element.

2. The tire for a heavy vehicle of construction plant type according to claim 1, wherein a thickness (e) of the transition element is at least equal to 0.1 times a distance ($d_3$) between an end of the turn-up and the main part.

3. The tire for a heavy vehicle of construction plant type according to claim 1, wherein a thickness (e) of the transition element is at most equal to 0.5 times a distance ($d_3$) between the end of the turn-up and the main part.

4. The tire for a heavy vehicle of construction plant type according to claim 1, wherein the elastic modulus at 10% elongation of the polymer transition material is at least equal to 0.9 times, and at most equal 1.1 times, the arithmetic mean of the respective elastic moduli at 10% elongation of the first and second polymer filling materials.

5. The tire for a heavy vehicle of construction plant type according to claim 1, wherein the radially inner face of the transition element is in continuous contact with the main part between a first point of contact and a last point of contact which is a radially outermost point of the transition element.

6. The tire for a heavy vehicle of construction plant type according to claim 1, wherein the maximum distance (d2) between the turn-up and the main part is at least equal to 1.1 times the minimum distance ($d_1$) between the turn-up and the main part.

7. The tire for a heavy vehicle of construction plant type according to claim 1, mounted on a rim, and comprising a point A on the turn-up, which point is positioned at the minimum distance ($d_1$), axially on the outside of the main part, and at a distance ($H_A$), radially on the outside of a reference line (S) of the rim, the radially outermost point F of the rim being positioned at a distance ($H_F$), radially on the outside of a reference line (S) of the rim, wherein the distance ($H_A$) from the point A of the turn-up, positioned at the minimum distance ($d_1$) axially on the outside of the main part, to the reference line (S) of the rim is at least equal to 1.25 times and at most equal to 2.5 times the distance ($H_F$) from the radially outermost point F of the rim to the reference line (S) of the rim.

8. The tire for a heavy vehicle of construction plant type according to claim 1, mounted on a rim, and comprising a point B of the turn-up, which point is positioned at the maximum distance ($d_2$), axially on the outside of the main part, and at a distance ($H_B$), radially on the outside of a reference line (S) of the rim, the radially outermost point (F) of the rim being positioned at a distance ($H_F$), radially on the outside of a reference line (S) of the rim, wherein the distance ($H_B$) from the point B of the turn-up, positioned at the minimum distance ($d_2$) axially on the outside of the main part, to the reference line (S) of the rim is at least equal to 2 times and at most equal to 4 times the distance ($H_F$) from the radially outermost point F of the rim to the reference line (S) of the rim.

9. A tire for a heavy vehicle of construction plant type comprising:
   two beads adapted to come into contact with a rim,
   a carcass reinforcement comprising:

at least one carcass reinforcement layer made of a metal reinforcing elements, the carcass reinforcing layer comprising:
- a main part wrapped, within each bead, from the inside towards the outside of the tire around a bead wire to form a turn-up,
  wherein the distance (d) between the turn-up and the main part decreases continuously, radially towards the outside, from the bead wire, as far as a minimum distance ($d_1$), then increases continuously as far as a maximum distance ($d_2$), wherein each bead comprises:
- a filling element extending the bead wire radially towards the outside,
  wherein the filling element is formed of at least two polymer filling materials,
  - wherein a first polymer filling material is radially furthest towards the inside and in contact with the bead wire, and
  - wherein a second polymer filling material is radially on the outside of the first polymer filling material, and having an elastic modulus at 10% elongation that is lower than the elastic modulus at 10% elongation of the first polymer filling material,
  - wherein a transition element, made of a polymer transition material, is in contact, via its radially inner face, with the first polymer filling material and in contact, via its radially outer face, with the second polymer filling material, and
- wherein a distance (a) between a first point of contact and a last point of contact of the radially inner face of the transition element with the main part is at least equal to the distance ($d_3$) between an end of the turn-up and the main part.

10. A tire for a heavy vehicle of construction plant type comprising:
two beads adapted to come into contact with a rim,
a carcass reinforcement comprising:
at least one carcass reinforcement layer made of a metal reinforcing elements, the carcass reinforcing layer comprising:
- a main part wrapped, within each bead, from the inside towards the outside of the tire around a bead wire to form a turn-up,
  wherein the distance (d) between the turn-up and the main part decreases continuously, radially towards the outside, from the bead wire, as far as a minimum distance ($d_1$), then increases continuously as far as a maximum distance ($d_2$), wherein each bead comprises:
- a filling element extending the bead wire radially towards the outside,
  wherein the filling element is formed of at least two polymer filling materials,
  - wherein a first polymer filling material is radially furthest towards the inside and in contact with the bead wire, and
  - wherein a second polymer filling material is radially on the outside of the first polymer filling material, and having an elastic modulus at 10% elongation that is lower than the elastic modulus at 10% elongation of the first polymer filling material,
  - wherein a transition element, made of a polymer transition material, is in contact, via its radially inner face, with the first polymer filling material and in contact, via its radially outer face, with the second polymer filling material,
- wherein a distance (a) between a first point of contact and a last point of contact of the radially inner face of the transition element with the main part is at most equal to 3 times the distance ($d_3$) between an end of the turn-up and the main part.

* * * * *